(12) United States Patent
Ferren (10) Patent No.: US 9,092,069 B2
(45) Date of Patent: Jul. 28, 2015

(54) CUSTOMIZABLE AND PREDICTIVE DICTIONARY

(75) Inventor: Bran Ferren, Beverly Hills, CA (US)

(73) Assignee: Intel Corporation, Santa Clara, CA (US)

(*) Notice: Subject to any disclaimer, the term of this patent is extended or adjusted under 35 U.S.C. 154(b) by 57 days.

(21) Appl. No.: 12/646,837

(22) Filed: Dec. 23, 2009

(65) Prior Publication Data

US 2010/0318903 A1 Dec. 16, 2010

Related U.S. Application Data

(60) Provisional application No. 61/187,520, filed on Jun. 16, 2009.

(51) Int. Cl.
*G06F 3/023* (2006.01)
*G06F 17/27* (2006.01)

(52) U.S. Cl.
CPC .......... *G06F 3/0237* (2013.01); *G06F 17/2735* (2013.01)

(58) Field of Classification Search
CPC ............................ G06F 17/2735; G06F 3/0237
USPC .............. 715/255, 259, 261; 704/10; 707/705
See application file for complete search history.

(56) References Cited

U.S. PATENT DOCUMENTS

| | | | |
|---|---|---|---|
| 6,240,521 B1 | 5/2001 | Barber et al. .................. | 713/323 |
| 6,272,545 B1 | 8/2001 | Flanagin et al. | |
| 6,282,508 B1 * | 8/2001 | Kimura et al. .................. | 704/10 |
| 6,317,831 B1 | 11/2001 | King | |
| 6,530,083 B1 | 3/2003 | Liebenow | |
| 6,603,469 B1 | 8/2003 | Gettemy et al. .............. | 345/211 |
| 6,633,274 B1 | 10/2003 | Yokota et al. | |
| 6,753,842 B1 | 6/2004 | Williams et al. | |
| 6,795,062 B1 | 9/2004 | Boursier ....................... | 345/204 |
| 6,874,089 B2 | 3/2005 | Dick et al. | |
| 6,910,139 B2 | 6/2005 | Ishidera ........................ | 713/320 |
| 6,973,333 B1 | 12/2005 | O'Neil | |

(Continued)

FOREIGN PATENT DOCUMENTS

| | | |
|---|---|---|
| CN | 1662870 | 8/2005 |
| CN | 1961588 A | 5/2007 |

(Continued)

OTHER PUBLICATIONS

Non-final Office Action for United Kingdom Patent Application No. GB1009708.7 mailed Aug. 25, 2010.

(Continued)

*Primary Examiner* — Adam M Queler
(74) *Attorney, Agent, or Firm* — Blakely, Sokoloff, Taylor & Zafman LLP (57) ABSTRACT

A first list of forbidden words is selected from a plurality of lists of forbidden words on a computing device when the computing device is set to a first user mode corresponding to the first list of forbidden words, wherein each of the plurality of lists of forbidden words corresponds to at least one user mode of a plurality of user modes and contains user mode-based forbidden words whose use on the computing device is prohibited when the computing device is set to one or more corresponding user modes. First mode-based forbidden words of the first list of forbidden words are prevent from being be used on the computing device for as long as the computing device is set to the first user mode.

25 Claims, 7 Drawing Sheets

(56) References Cited

U.S. PATENT DOCUMENTS

| | | | |
|---|---|---|---|
| 7,123,247 B2 | 10/2006 | Morita | |
| 7,190,338 B2 | 3/2007 | Kubota et al. | |
| 7,239,742 B2 | 7/2007 | Ohtani et al. | |
| 7,424,674 B1* | 9/2008 | Gross et al. | 715/257 |
| 7,463,255 B2 | 12/2008 | Yang | 345/211 |
| 7,581,180 B2* | 8/2009 | Masui et al. | 715/259 |
| 7,782,333 B2 | 8/2010 | Yamaguchi et al. | |
| 8,254,957 B2 | 8/2012 | Ferren et al. | 455/456.1 |
| 2002/0028684 A1 | 3/2002 | Kuwahra et al. | |
| 2002/0040442 A1 | 4/2002 | Ishidera | |
| 2002/0119788 A1 | 8/2002 | Parupudi et al. | |
| 2002/0138286 A1 | 9/2002 | Engstrom | |
| 2002/0173295 A1 | 11/2002 | Nykanen et al. | |
| 2002/0180723 A1 | 12/2002 | Siwinski | |
| 2003/0126330 A1 | 7/2003 | Balasuriya | |
| 2003/0134640 A1 | 7/2003 | Kim et al. | |
| 2003/0200481 A1 | 10/2003 | Stanley | |
| 2004/0203768 A1 | 10/2004 | Ylitalo et al. | |
| 2004/0230593 A1 | 11/2004 | Rudin et al. | |
| 2004/0257316 A1 | 12/2004 | Nguyen | |
| 2005/0044423 A1 | 2/2005 | Mellmer et al. | |
| 2005/0110717 A1 | 5/2005 | Iwamura | 345/76 |
| 2005/0124389 A1 | 6/2005 | Yang | |
| 2005/0283724 A1* | 12/2005 | Griffin | 715/532 |
| 2006/0036895 A1 | 2/2006 | Henrickson | |
| 2006/0123081 A1 | 6/2006 | Baudino et al. | |
| 2006/0132474 A1 | 6/2006 | Lam | |
| 2006/0206733 A1 | 9/2006 | Ono | |
| 2006/0236144 A1 | 10/2006 | Chao | |
| 2006/0267972 A1 | 11/2006 | Yi | 345/211 |
| 2007/0004393 A1 | 1/2007 | Forsberg et al. | |
| 2007/0021108 A1 | 1/2007 | Bocking et al. | |
| 2007/0073725 A1 | 3/2007 | Klein, Jr. et al. | |
| 2007/0082712 A1 | 4/2007 | Ikeda et al. | |
| 2007/0226649 A1* | 9/2007 | Agmon | 715/816 |
| 2008/0055318 A1 | 3/2008 | Glen | 345/501 |
| 2008/0220715 A1 | 9/2008 | Sinha et al. | |
| 2008/0243808 A1* | 10/2008 | Rieman et al. | 707/5 |
| 2008/0253345 A1 | 10/2008 | Sanguinetti | |
| 2008/0261593 A1 | 10/2008 | Wong et al. | |
| 2008/0288955 A1 | 11/2008 | Brockway et al. | |
| 2009/0019131 A1 | 1/2009 | Ganesan | |
| 2009/0070030 A1 | 3/2009 | Isoda et al. | |
| 2009/0070606 A1 | 3/2009 | Chen et al. | |
| 2009/0088089 A1 | 4/2009 | Chandra et al. | |
| 2009/0106266 A1 | 4/2009 | Donatelli et al. | |
| 2009/0138276 A1 | 5/2009 | Hayashida et al. | |
| 2009/0163226 A1 | 6/2009 | Karkaria et al. | |
| 2009/0165145 A1 | 6/2009 | Haapsaari et al. | |
| 2009/0176505 A1 | 7/2009 | Van Deventer et al. | |
| 2009/0213762 A1 | 8/2009 | Guo et al. | |
| 2009/0286557 A1 | 11/2009 | Clipsham | |
| 2009/0322800 A1 | 12/2009 | Atkins | 345/690 |
| 2010/0062788 A1 | 3/2010 | Nagorniak | |
| 2010/0063867 A1 | 3/2010 | Proctor et al. | |
| 2010/0120450 A1 | 5/2010 | Herz | |
| 2010/0277512 A1 | 11/2010 | Shen et al. | 345/690 |
| 2010/0298048 A1* | 11/2010 | Yamazaki | 463/30 |
| 2010/0317336 A1 | 12/2010 | Ferren et al. | |
| 2010/0318903 A1* | 12/2010 | Ferren | 715/259 |
| 2011/0010458 A1 | 1/2011 | Das et al. | |
| 2011/0074765 A1 | 3/2011 | Oterhals et al. | 345/418 |
| 2011/0080419 A1 | 4/2011 | Croxford et al. | 345/531 |
| 2011/0116491 A1 | 5/2011 | Kovacs et al. | |
| 2012/0302323 A1 | 11/2012 | Gagner et al. | |

FOREIGN PATENT DOCUMENTS

| | | |
|---|---|---|
| CN | 101048810 | 10/2007 |
| CN | 101291341 A | 10/2008 |
| CN | 101303747 | 11/2008 |
| CN | 101303747 A | 11/2008 |
| CN | 101447987 A | 6/2009 |
| CN | 101464722 A | 6/2009 |
| EP | 1217792 | 6/2002 |
| EP | 1204262 | 3/2004 |
| EP | 1445923 | 8/2004 |
| EP | 1737193 | 12/2006 |
| EP | 1903759 | 3/2008 |
| EP | 2076001 | 7/2009 |
| GB | 2373914 | 10/2002 |
| GB | 2397196 | 7/2004 |
| GB | 2421147 | 6/2006 |
| JP | 2009-138716 | 5/1997 |
| JP | 2000-250455 | 9/2000 |
| JP | 2003-284138 | 10/2003 |
| JP | 2004503875 A | 2/2004 |
| JP | 2004-260796 | 9/2004 |
| JP | 2005526312 A | 9/2005 |
| JP | 2006-236159 | 9/2006 |
| JP | 2007-135006 | 5/2007 |
| JP | 2007135006 | 5/2007 |
| JP | 2007-219835 | 8/2007 |
| JP | 2007-282017 | 10/2007 |
| JP | 2008-193546 | 8/2008 |
| JP | 2009-49564 | 3/2009 |
| JP | 2009-116459 | 5/2009 |
| JP | 2010011334 | 1/2010 |
| JP | 2010107784 | 5/2010 |
| KR | 102009003836 | 4/2009 |
| TW | 200638188 | 11/2006 |
| TW | M350028 U | 2/2009 |
| WO | WO01/97074 | 12/2001 |
| WO | WO03/009511 | 1/2003 |
| WO | WO03/088127 | 10/2003 |
| WO | WO-2005/101239 | 10/2005 |
| WO | WO2006/042265 A2 | 4/2006 |
| WO | WO-2006/045424 | 5/2006 |
| WO | WO-2007038281 | 4/2007 |
| WO | WO2007038281 | 4/2007 |
| WO | WO-2008067261 | 6/2008 |
| WO | WO-2008/091479 | 7/2008 |
| WO | WO2010/133770 | 11/2010 |
| WO | WO2010147610 | 12/2010 |

OTHER PUBLICATIONS

Non-final Office Action for United Kingdom Patent Application No. GB1009714.5 mailed Aug. 18, 2010.
Combined Search Report and Examination Report for United Kingdom Patent Application 1009711.1 issued Sep. 23, 2010 Mailed Oct. 22, 2010., 17 pages.
Application 1009711.1 issued Sep. 23, 2010 Mailed Oct. 22, 2010., 17 pages.
"Office Action dated Nov. 5, 2012(+English Translation), in Chinese Patent Application No. 201010206761.4, 14pages".
Non-Final Office Action for Chinese. Patent Application No. 201010208688.4, Mailed Oct. 9, 2012, 8 pages.
Notice of Preliminary Rejections mailed Dec. 18, 2012, in Japanese Patent Application No. 2010-135661, 3 pages.
Decision on Rejection dated Sep. 3, 2013 (+ English translation), in Chinese Patent Application No. 201010206761.4, 11 pages.
Examination Report dated Aug. 1, 2013, in Great Britain Patent Application No. 1009711.1, 5 pages.
Final Rejection Decision dated Aug. 29, 2013 (+ English translation), in Japanese Patent Application No. 2010-135660, 4 pages.
Notice of Preliminary Rejection dated Jul. 31, 2012 (+ English translation), in Korean Patent Application No. 10-2010-57267, 6 pages.
Notice of Third Office Action dated Nov. 28, 2013 (+ English translation), in Chinese Patent Application No. 201010208646.0, 7 pages.
Office Action dated Jan. 10, 2013 (+ English translation), in Chinese Patent Application No. 201010208646.0, 23 pages.
Office Action dated Jan. 29, 2013 (+ English translation), in Japanese Patent Application No. 2010-135660, 4 pages.
Office Action dated Jun. 20, 2013 (+ English translation), in Chinese Patent Application No. 201010208646.0, 7 pages.
Second Office Action dated Jun. 24, 2013 (+ English translation). in Chinese Patent Application No. 201010208688.4, 9 pages.
Office Action dated Nov. 5, 2012 (+ English translation), in Chinese Patent Application No. 201010206761.4, 22 pages.

(56) References Cited

OTHER PUBLICATIONS

Office Action dated Oct. 9, 2012 (+ English translation), in Chinese Patent Application No. 201010208688.4, 14 pages.
Office Action mailed Mar. 26, 2013 (+ English translation), in Japanese Patent Application No. 2010-135662, 7 pages.
Official Action dated Aug. 12, 2013 (+ English translation), in German Patent Application No. 102010019637.1, 13 pages.
Second Office Action dated Apr. 24, 2013 (+ English translation), in Chinese Patent Application No. 201010206761.4, 20 pages.
Translation of Decision of Refusal dated Dec. 18, 2012, in Japanese Patent Application No. 2010-135661, 3 pages.
Third Office Action Dated Dec. 24, 2013, Chinese Application No. 201010208688.4 3 pages.
Second Office Action Dated Jun. 24, 2013, Chinese Application No. 201010208688.4 3 pages.
Non-final Office Action for United Kingdom Patent Application No. GB1009714.5 mailed Oct. 18, 2011.
First Office Action for German Patent Application No. 10 2010 023 691.8-31 mailed Dec. 2, 2011.
Final Office Action for U.S. Appl. No. 11/020,397, Mailed Jun. 30, 2008, 13 pages.
Non-Final Office Action for U.S. Appl. No. 11/020,397, Mailed Sep. 11, 2007, 12 pages.
Non-Final Office Action for U.S. Appl. No. 12/646,658, Mailed Aug. 23, 2011, 16 pages.
Notice of Preliminary Rejection for Korean Patent Application No. 10-2010-57105, Mailed Jun. 23, 2011, 5 pages.
Notice of Preliminary Rejection mailed Jul. 31, 2012(+English Translation), in Korean Patent Application No. 10-2010-57267, 6 pages.
First Official Action mailed Apr. 10, 2012(+English translation), in Japanese Patent Application No. 2010-135660, 6 pages.
Office Action mailed May 22, 2012(+English translation), in Japanese Patent Application No. 2010-135662, 6 pages.
Combined search and examination report mailed May 2, 2012, un Great Britain Patent Application No. GB1009714.5, 3 pages.
International Search Report and Written Opinion received for international Application No. PCT/US2009/069927, mailed Jul. 29, 2010, 7 pages.
Office Action mailed Apr. 24, 2012, in U.S. Appl. No. 13/376,618, 11 pages.
Office Action mailed May 8, 2012(+ English translation), in Japanese Patent Application No. 2010-135661, 9 pages.
Examination Report dated Jun. 14, 2012, in Great Britain Patent Application No. GB 1009711.1, 4 pages.
Examination Report mailed Jan. 12, 2012, Great Britain Patent Application No. GB1009711.1, 6 pages.
Notice of Preliminary Rejections mailed Jul. 31, 2012(+English translation), in Korean Patent Application No. 10-2010-57267, 6 pages.
Non-Final Office Action for U.S. Appl. No. 12/646,837, Mailed Jun. 6, 2011, 12 pages.
Office Action from UK1009708.7 mailed Jan. 9, 2012, 2 pages.
Office Action mailed Jun. 6, 2012, in U.S. Appl. No. 12/646,730, 20 pages.
Search Report of R.O.C. Patent Application No. 099112857, Oct. 28, 2014, 1 pg.
First Office Action for German Patent Application No. 10 2010 023 692.6-31 mailed Mar. 18, 2011.

\* cited by examiner

CUSTOMIZABLE AND PREDICTIVE DICTIONARY

RELATED APPLICATION

The present application claims the priority of provisional application Ser. No. 61/187,520, filed Jun. 16, 2009, entitled Multi-Mode Handheld Electronic Device.

FIELD

The field relates generally to the computing sciences and, more particularly, to customizable and predictive dictionary in a computing device.

BACKGROUND

With the increasing use of smaller mobile computing devices, there is an increasing demand for intelligent and efficient typing. Many modern mobile computing devices or personal digital assistants (PDAs) provide predictive techniques that are limited to predicting the next letter of a word. However, often these predictive techniques incorrectly predict the next letter. Some more advanced predictive techniques provide multiple text predictions and allows the user to select the correct letter or, in some cases, the entire word. However, these predictive predictive techniques lack necessary intelligence to be efficient and are cumbersome to use. Further, many of these conventional predictive techniques merely rely on a previously inputted fixed lists of words rather than a dynamic and intelligent dictionary.

BRIEF DESCRIPTION OF THE DRAWINGS

Embodiments of the present invention are illustrated by way of example and not by way of limitation in the figures of the accompanying drawings, in which like references indicate similar elements and in which.

DETAILED DESCRIPTION

In one embodiment, a customizable and predictive dictionary is provided for a computing device to dynamically correct or complete misspellings or partial spellings of words or phrases and further, to prevent a user from using forbidden words (and to suggest to the user alternative words) in one or more user life modes of the computing device. This novel technique allows the user to avoid any potentially embarrassing corrections as well as situations. (This is unique because the conventional predictive techniques are not intelligent enough to recognize that a suggested correction might still be incorrect and/or possibly embarrassing or even against, for example company rules). Further, an embodiment of the customizable and predictive dictionary contains forbidden words that, for example, can be flagged for correction and offered for correction or completion. Thus, using this novel dictionary and predictive technique, these forbidden words prevent the user from using the offensive or inappropriate or forbidden words both if done inadvertently or even if the user had originally intended to use them.

Nevertheless, in one embodiment, the user is given the authority to override any of the words regarded as forbidden words. In another embodiment, both regular words and forbidden words are stored on the computer device; however, forbidden words may be provided through one or more lists that are separate from a dictionary that simply includes the regular words. In another embodiment, one or more forbidden words may be made part of the dictionary. Regarding multiple lists of forbidden words, for example, words from one list can be overridden, but words from another dictionary may be not overridden. Further, a separate list of forbidden words may be maintained for each life mode (e.g., work mode, family mode, and play mode). In one embodiment, each life mode has a sensitivity and tolerance level associated with it and thus, each forbidden word is automatically assigned a "tolerance" level based on the life mode within which it is used or attempted to be used. In another embodiment, the user may also specify a "tolerance" level that to be associated with each word or phrase, etc., such as spelling and grammar that varies from one life mode to another life mode (e.g., stricter for work mode and looser for family mode and even looser for play mode).

Work mode encompasses time at the office or other places of work, but also includes, for example, email and phone communications, documents, expense reports, software applications, security, and scheduling operations relating to work. Family mode involves interactions with spouse, children and other family, as well as with neighbors and teachers. In this mode, email and phone communications are particularly important, as are scheduling tools, document editors, and web applications, such as social networking, blogs, and photo and video uploads. Typical tasks include personal finance, children's schooling, and home maintenance. Finally, play mode focuses on the user as an individual and his friends (outside of the family). In this mode, as in the family mode, email and phone communications, scheduling tools, and web applications are likely to be of importance. The play mode is personal in nature where individual interests, such as entertainment and hobbies, are pursued, and communications are conducted with circles of friends based on interest profiles. Although these three life modes are discussed here as examples and for brevity and clarity, it is contemplated that other similar modes based on the various (prominent) aspects of an individual user's life may be added/removed/modified to the mobile computing device. For example, a professional's life may have work, family, and personal aspects, a teenager's life may have school, family, and friends aspects, while a retiree's life may have finance, family, and friends aspects and thus, each individual's computing device can be customized or modified accordingly.

Figure 1:
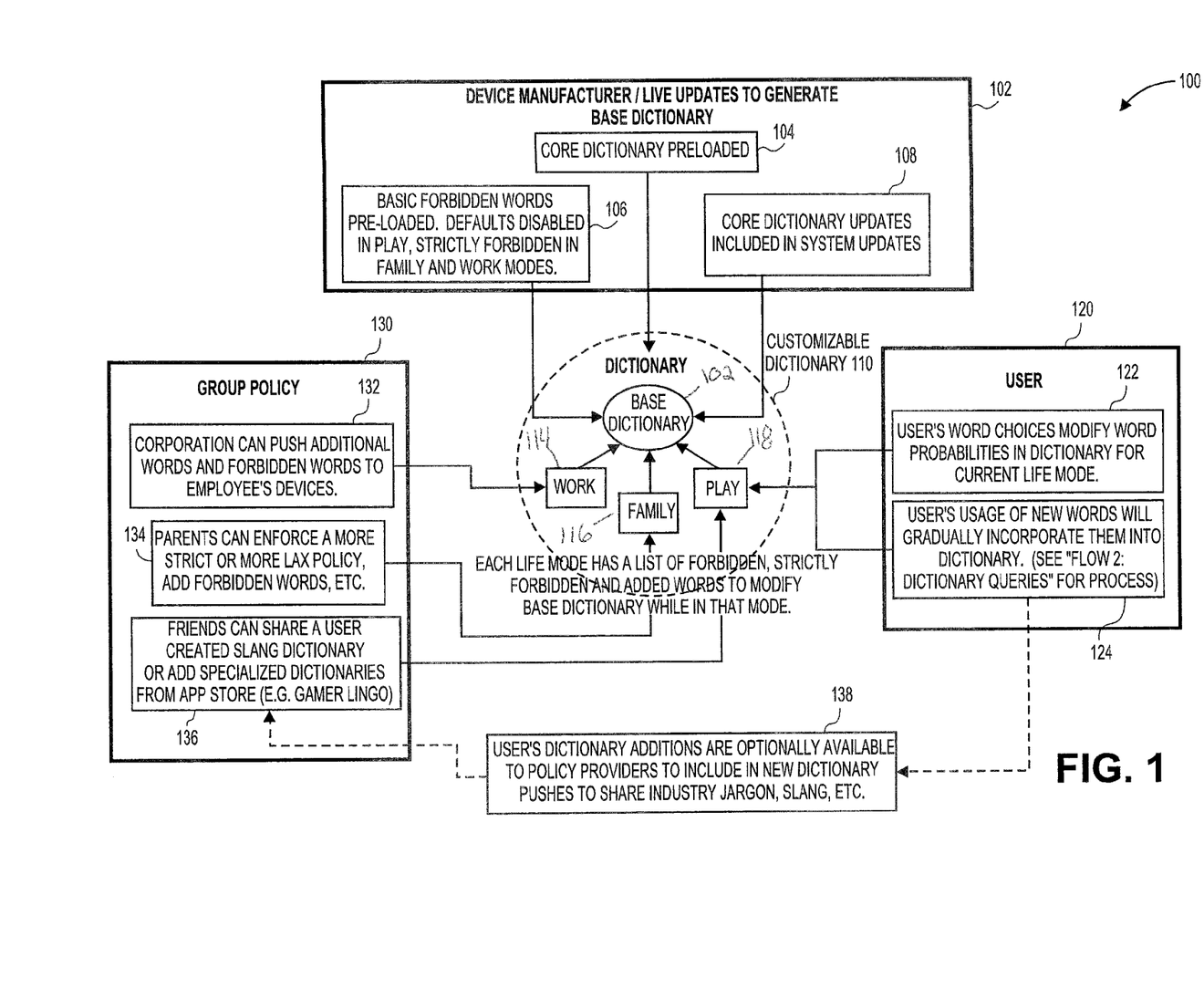
FIG. 1 illustrates an embodiment of a customizable architecture 100 for providing a customizable and predictive dictionary.

FIG. 1 illustrates an embodiment of a customizable dictionary architecture 100 for providing a customizable and predictive dictionary (customizable dictionary) 140. The architecture (or mechanism) 100 provides construction, update, modification and use of the customizable dictionary 140. In one embodiment, a core dictionary 104 is preloaded on a computing device (e.g., a mobile computing device) on the manufacturing end at or around the time of manufacturing. Although the core dictionary 104 is preloaded on the device, subsequent live and delayed updates to the dictionary may also be provided to the user via, for example, software/application updates. For example, when a new word is added to the language (e.g., English, Spanish, French), an application update to the core dictionary 104 may be provided to the user so that the word can be added to the preloaded core dictionary 104. Thus, the core dictionary 104 includes core dictionary updates 108 included in the system updates and it further includes pre-loaded basic (universal) forbidden words 106 that are generally considered forbidden in one or more of the work mode, family mode, and play mode. Some of these basic forbidden words 106 may be strictly forbidden in the work mode but not so in the play mode or vice versa. Having basic forbidden words 106 and (live/scheduled/delayed) core dictionary updates 108, the core dictionary is upgraded into a base dictionary 102 on the computing device.

Although a base dictionary 110 is provided on the computing device, the additional control of adding lists of forbidden and strictly forbidden words (as they relate to various life modes of the computing device) is given to the user 120 of the computing device and any organizations or groups 130 that are affiliated with the user (e.g., the user's employer, parents, or friends, etc.). For example, the user 120 may provide word choices 122 that can automatically modify the word probabilities in the base dictionary 110 for the current life mode (e.g., play mode 118) and, similarly, the user's usage of new words 124 may gradually incorporate such new words into the base dictionary 110. This is further explored in FIG. 3.

Certain modifications associated with the base dictionary 110 are made based on the user's associations or groups and their policies 130 (e.g., employer, parents, or friends, etc.). These modifications are made in terms of associates lists 114-118 of forbidden (and strictly forbidden words that are appropriately forbidden (and strictly forbidden) for each live mode. For example, a work mode list 114 of forbidden words is generated to be associated with the base dictionary 102 which already includes basic forbidden words 106. This work mode list 114 may include two lists of forbidden words: one list of work mode forbidden words and another list of work mode strictly forbidden words. Similarly, family mode lists 116 and play mode lists 118 of relevant forbidden words and strictly forbidden words are generated and associated with the base dictionary 102. In one embodiment, work mode list 114, family mode list 116 and play mode list 118 are maintained separately from the base dictionary 102 and are regarded as deviation from the content of the base dictionary 102. In other words, these forbidden words are regarded and maintained as such based on their sensitivity, tolerance, and usage relating to each life mode and these words can be added to or removed from the mode lists 114-116 (or their tolerance level can be adjusted up or down) by the user or an organization or group associated with the user. As aforementioned, these mode lists 114-116 are associated with and maintained separately from the base dictionary 102. Collectively, in one embodiment, the base dictionary 102 and its associated life mode lists of forbidden and strictly forbidden words are referred to (and illustrated) as customizable dictionary 110.

As illustrated, the user's employer, such as a corporation, 132 may consider certain words to be offensive or inappropriate (e.g., words of sexual or racial nature that can be regarded as suggesting sexual or racial harassment) and these words are added to the work mode list 114 of forbidden (and strictly forbidden) words and associated with the base dictionary 110 so that such words remain forbidden under the work mode. If the user chooses, she may add some of these forbidden words (e.g., racially offensive words) to other mode lists 116, 118 because the use of such words is considered inappropriate when used in social situations (and not only when used in a professional environment). Certain forbidden or strictly forbidden words of the work mode list 114 may include words that may not be regarded inappropriate in other circumstances or social settings but their usage may be considered against the employer's rules. For example, if the user works for the government, even a word like "Manhattan" may be regarded forbidden for representing a classified project but would be perfectly fine to use in other modes.

Figure 2A:
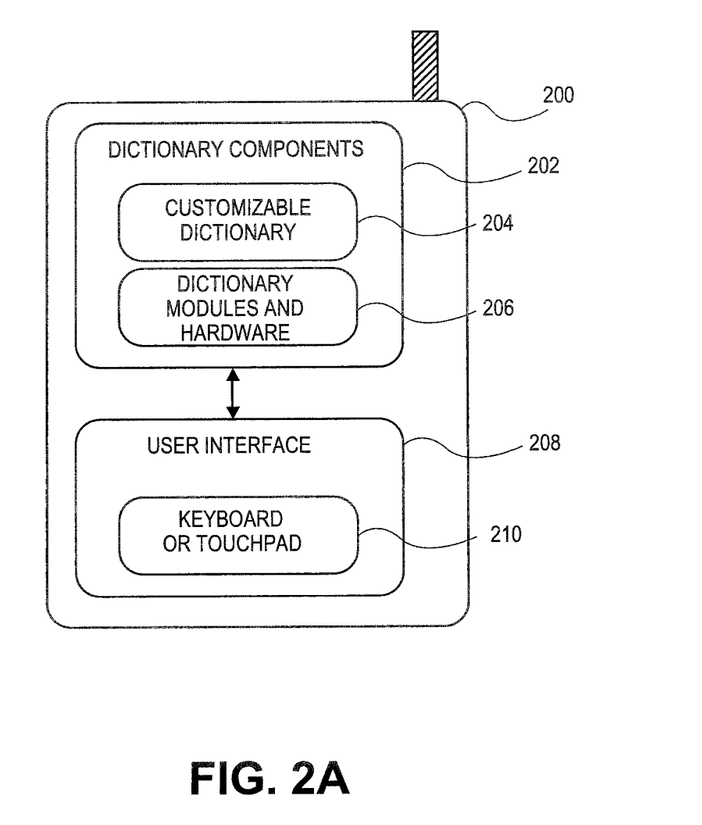
FIG. 2A illustrates an embodiment of a mobile computing device having a customizable and predictive dictionary.

Similarly, parents 134 of the user may enforce a strict or relaxed policy to the user's computing device (e.g., could be a different policy for each child according to his or her age) and, accordingly, certain words may be added to or removed from the family mode list 116. Any number of friends 136 of the user may share or create their own words (e.g., slang words) to be added to the play mode list 118 associated with the base dictionary 110. These friends-understood words may range from a game lingo (corresponding to an online game downloaded as a software application) to sports terminology to childhood slangs (serving as secret language for a group of friends) or even a short form for certain words, such as "u" for the word "you", "k" for the word "okay", "btw" for the phrase "by the way", etc. This way each life mode can have its own list 114-118 of forbidden or strictly forbidden words that are used according to the current life mode of the computing device. Further, a user's dictionary additions may be optionally available 138 to policy providers 130 for inclusion in subsequent modifications to the base dictionary 102. For example, a corporation can harvest recently developed industry jargon and slang, etc. and push these terms to other users FIG. 2A illustrates an embodiment of a mobile computing device 200 having a customizable dictionary 202. In one embodiment, the computing device 200 includes dictionary components 202 having a customizable dictionary 204 that includes a base dictionary and associated life mode lists of forbidden and strictly forbidden words, such as the base dictionary 102 and life mode lists 114-118 of FIG. 1. Customizable dictionary 204 may further include other relevant and separate lists of words (e.g., newly forbidden words or words to be removed from one or more of the forbidden words lists) that remain associated with the base dictionary and are added or removed later. These dictionary components 202 further include dictionary software and hardware components to perform certain tasks, such as adding or removing or modifying words of the customizable dictionary 204 including the forbidden and strictly forbidden words of the mode lists associated with the base dictionary. These dictionary components 202 along with other components of the computing device 200 are also used to detect the computer device's current life mode so an appropriate life mode list of forbidden words can be triggered and used. This is further detailed in FIG. 2B. The computing device 200 further includes various user interfaces 208 to receive and transmit data to the user. One of the user interfaces includes a keyboard or touchpad 210 for the user to use for typing words, phrases, etc. Other user interfaces (e.g., various input/out (I/O) interfaces) may be employed for communication of words and phrases between the user and the device 200 and further with the dictionary components 202 including the base dictionary 204.

Figure 2B:
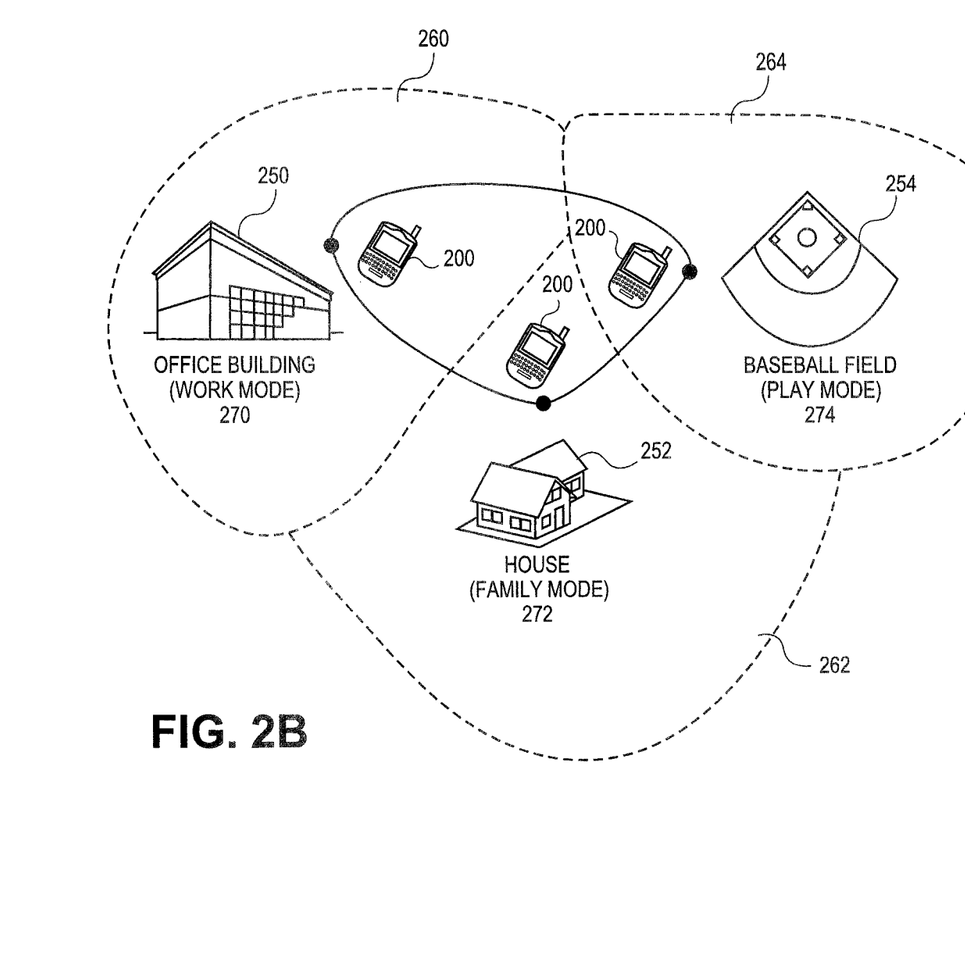
FIG. 2B illustrates an embodiment of various user modes.

FIG. 2B illustrates an embodiment of various user modes 270-274. In one embodiment, user modes 270-274 may be set using time slots, such as 8-5 am is set as work mode 270, 5-7 pm is set as play mode, 7 pm-8 am is set as family mode, Saturday is set as play mode, Sunday is set as family mode, and the like. In another embodiment, user modes 270-274 may be set automatically by the device by being aware of the device's surroundings. For example, if the user with his or her computing device 200 is in the office or within a set proximity 260 of the office building 250, the device 200 can be programmed to presume that the user ought to be in word mode 270. Accordingly, work mode 270 is entered and the customizable dictionary mechanism invokes the work mode list of forbidden works to prevent the user from using certain forbidden or strictly forbidden words (e.g., commonly forbidden words, words determined to be forbidden by the user, or those words that are regarded as forbidden by the user's employer) for as long as the computing device remains in the work mode.

Similarly, if the device 200 enters a set proximity 262 of the house 252, the device is automatically presumed to have entered family mode 272. As with the work mode, the computing device 200 and the dictionary components 202 trigger the family mode list of and the user is prevented by the device 200 and the relevant dictionary components 202 from using those words that are regarded as forbidden in the family mode 272. As with the work and family modes 270, 272, the play mode list of forbidden words is triggered as soon as the device 200 enters play mode 274 by, for example, being at a playfield 254 or another social venue (e.g., bar, club, etc.). Of course, it is contemplated that these modes 270-274 are triggered by the device entering the proximities 260-264 and not the user. In other words, the device 200 may be carried by an authorized family member or friend of the user and the same result can be achieved. On the other hand, the device 200 contains a security system (e.g., requiring a user ID or password/passcode, etc.) to prevent an unauthorized user (e.g., if the device 200 is stolen) from using the device 200 regardless of the proximity 260-264 of the device.

Figure 3:
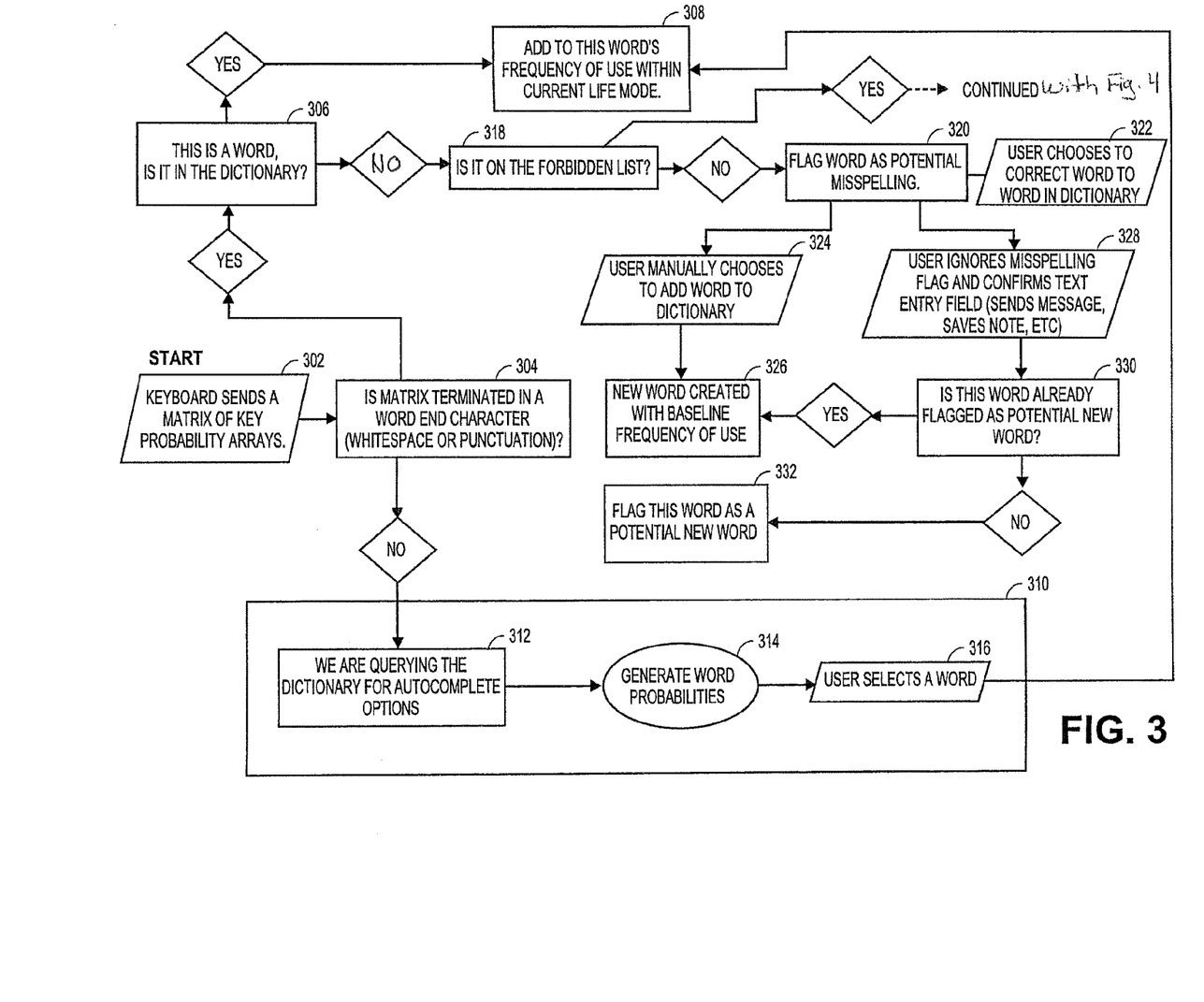
FIG. 3 illustrates an embodiment of a process for dictionary queries.

FIG. 3 illustrates an embodiment of a process for dictionary queries. In one embodiment, a matrix of key probabilities is received from a user interface (e.g., keyboard, touchpad) at block 302. Key probabilities generally refer to, based upon the distance from the user's touch centroid to the functional border of a key of a computing device, the relative probability that a given key of the computing device was the key the user intended to use. Thus, for each letter in a word, there is a list of other potential letters that may have been intended as well as their relative likelihood. At block 304, a determination is made as to whether the array is terminated in a word end character (e.g., whitespace or punctuation). If yes, the array is regarded as a word and a determination is made as to whether it is in the (base) dictionary at block 306. If the word is in the dictionary, at block 308, the frequency of the use of the word within the current life mode is added to the frequency of that word. In other words, any increment, update, modification, or adjustment of the frequency of the word may be based on the word's recent use. If the matrix is not in the dictionary, another determination is made as to whether the word is on the forbidden list at block 318. From the user's perspective, these words are maintained in two separate lists. However, there may be some overlap in actual storage depending upon the database framework that is utilized; nevertheless, the forbidden words are provided in life mode lists separate from the base dictionary but are associated with it. If the word is on the forbidden list, the process continues with FIG. 4. If the word is not on the forbidden list, the word is flagged as potential misspelling at block 320. In this case, the user may choose to correct the word to a word in the dictionary at block 322.

Alternatively, the user may choose to manually add the word to the dictionary at block 324. A new word may then be created with a baseline (generic) frequency of use (e.g., based on previous research relating to the word) at block 326. Referring back to block 320, the user may alternatively ignore the misspelling flag and confirm the text entry field as is (e.g., to send a message, save a note, etc.) at block 328. At block 330, a determination is made as to whether the word is already flagged as a potential new word. If the word is flagged as a potential new word, a new word is created with a baseline frequency of use at block 326. For example, when a word enters the dictionary, it may enter at a low priority level and is unlikely to appear in suggestions until its frequency of use is high enough for it to reach the main list. If the word is not flagged, the unflagged word is then flagged as a potential new word at block 332.

Referring back to block 304, if the array is not terminated in a word end character, the process continues with the querying of the dictionary for auto-complete options at block 312. Based on the query, word probabilities are generated at block 314. This continues with the user selecting a word at block 316 and adding the word to the dictionary with the given frequency of use of the word being added to the frequency of the word within the current or any particular life mode at block 308. This is regarded as baseline frequency of use of the word (as the median frequency of use may be relatively low). In other words, any increment, update, modification, or adjustment of the frequency of the word may be based on the word's recent use. Further details are provided in FIG. 5.

Figure 4:
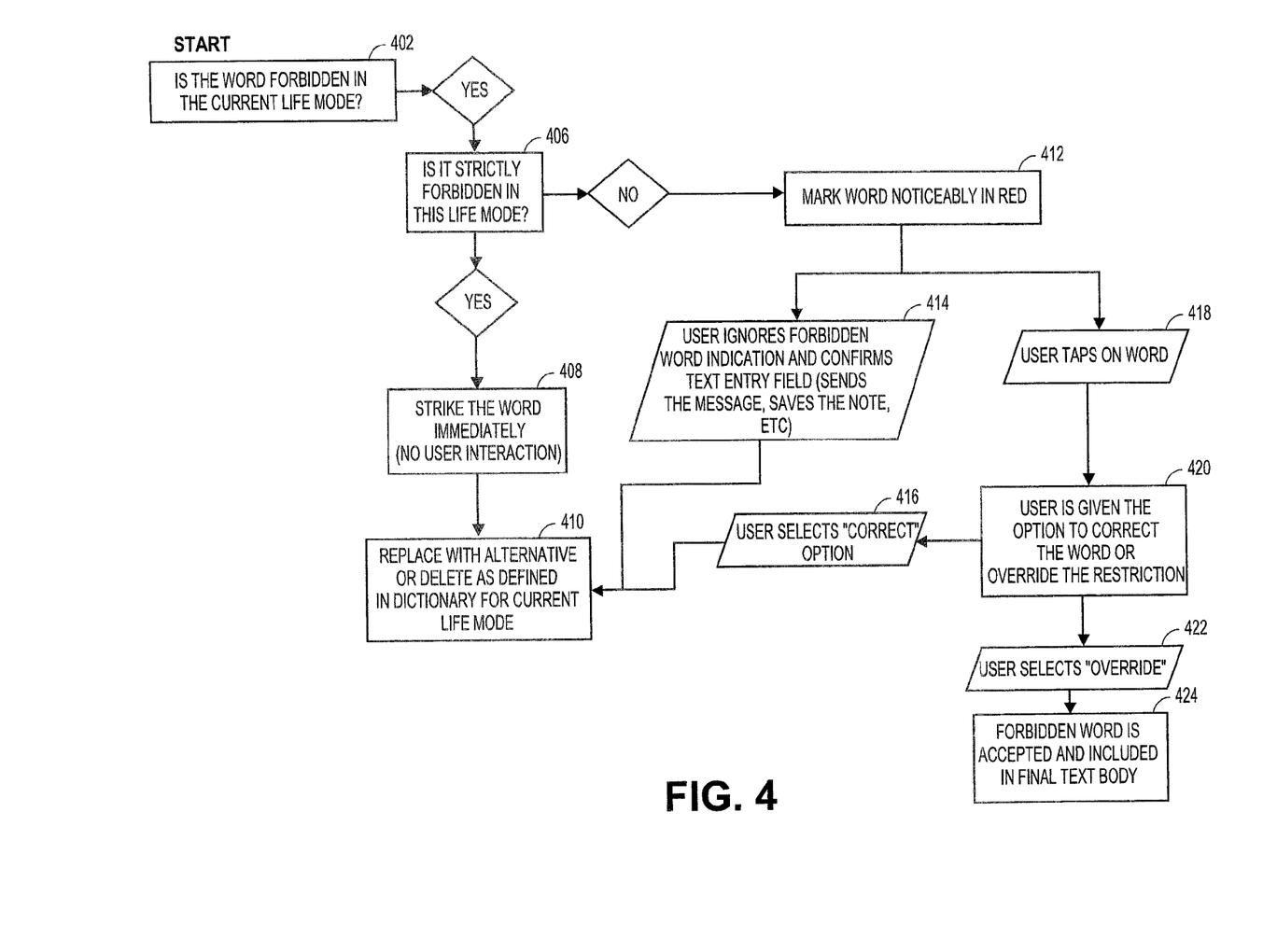
FIG. 4 illustrates an embodiment of a process for dictionary queries relating to forbidden words.

FIG. 4 illustrates an embodiment of a process for dictionary queries relating to forbidden words. Referring back to block 318 of FIG. 3, here at block 402, a determination is made as to whether the word is on the forbidden list for the current life mode. As aforementioned, it is normal and contemplated that a word that is forbidden in one life mode but may be allowed in another life mode. If the word is forbidden in the current life mode, a determination is made as to whether the word is strictly forbidden in the current life mode at block 406. If the word is strictly forbidden, the word is struck (without any user interaction or influence) at block 408. The stricken word is then replaced with an alternative word or is simply deleted from the active text entry field of the computing device at block 410.

Referring back to block 406, if the word is not strictly forbidden in the current life mode, the word is marked or highlighted in some way (e.g., assigning the color red to the word, sounding an alarm, significantly bolding the letters of the word, etc.) at block 412. Once the word is marked, two options are provided. The first option being the user can ignore the forbidden word indication or marker and confirm the text entry field for the word (e.g., proceed with sending the message (email or SMS text), saving the note, etc.) at block 414. In this case, the word is then replaced with an alternative word or deleted from the current text entry field as determined or defined by the user or organization or group policy settings in the forbidden word list of the current life mode at block 410.

The second option being the user taps or clicks on the word at block 418 and thereafter, the user is given the option of correcting the word or overriding the restriction at block 420. The user can choose the first option of selecting to correct the word at block 416 and replace the word with an alternative word at block 410. The user can choose the second option of overriding the word at block 422 and the process continues with the word being accepted and retained in the text entry field and included in the final saved or sent message (e.g., email, SMS text, note, etc.).

Figure 5:
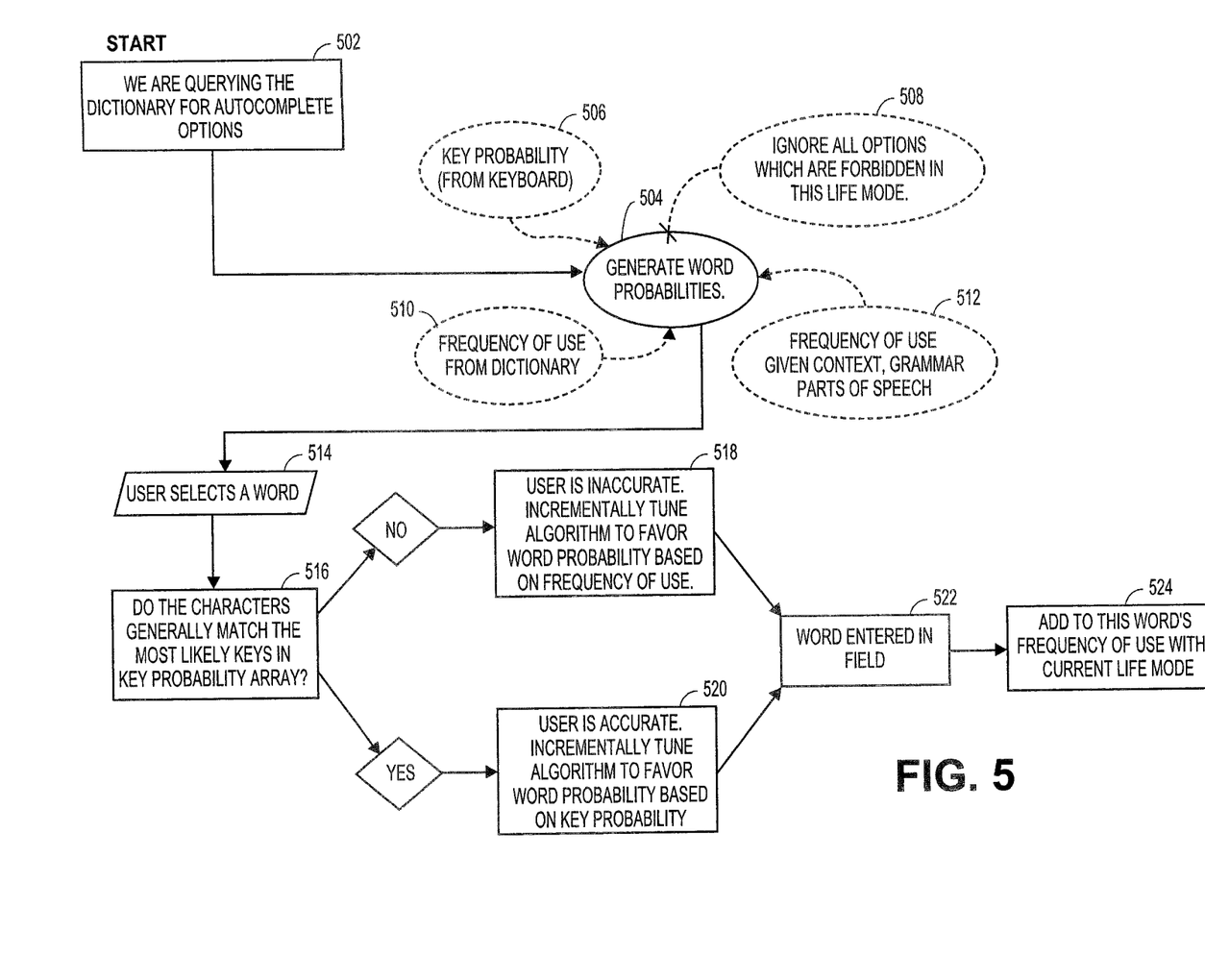
FIG. 5 illustrates an embodiment of a process for dictionary queries relating to auto-complete flow details.

FIG. 5 illustrates an embodiment of a process for dictionary queries relating to auto-complete flow details. At block 502 (same as block 312 of FIG. 3), the base dictionary is queried for auto-complete options. The process continues with generating word probabilities at block 504 (here, shown as an inset view or expansion of block 314 of FIG. 3), which includes obtaining a key probability from a keyboard or touchpad at block 506, obtaining the frequency of the use of the word from the dictionary at block 510, associating the frequency of the use and the context in which the word is used or the grammar that applies to the word in terms of speech at block 512, and ignoring those options that are forbidden in the current life mode at block 508. In other words, block 506 refers to key probabilities that are based on distance from the user's keystroke to the various keyboard keys. Block 510 refers to the relative frequency of use of a given word as stored in the base dictionary and modulated by the user's personal frequency of use as stored in the current life mode list associated with the base dictionary. The life mode dictionary functions as a modifier on top of the words already contained in the base dictionary. Block 512 includes two different processes working together. First, the words preceding the current word, within a given section, are parsed to determine their parts of speech, (such as whether they are nouns, verbs, etc.). A rough map of the clauses is formed, both complete and incomplete, and the likelihood that the next word will be a certain part of speech is predicted. Second, the user's pattern of word choices is observed and is compare to the preceding words. For example, if the user frequently uses the word "today" after "how are you", then this word "today" is considered more likely in this context. These criteria are blended to create a list of likely word candidates. Any of these word candidates that are forbidden in the current life mode are tossed out and the system resources are not wasted on calculating or processing probabilities on such words.

The process continues with the user selecting a word at block (same as block 316 of FIG. 3). Then, at block 516, a determination is made as to whether characters of the word generally match the most likely keys in the key probability array. If not, the user is determined to be inaccurate and the process for generating word probabilities 504 is incrementally tuned to favor the word probability based on the frequency of use 510 of the word at block 518. The data merging at block 504 is blended together with dynamic weights and the assumption is that when a user's word choice does not match, at a particular frequency, the key to which the strokes were closest to, then the user is regarded as an inaccurate typist. In this case, per block 504, word probability is favored and generated and the nearby keys are given strong consideration. In contrast, for those users that are regarded as accurate typists, their keystrokes are gradually trusted more and more. The word is then entered in the field at block 522 and the frequency of the word is used increment, update and modify the word to reflect that the word has been recently used (one more time) at block 524 (same as block 308 of FIG. 3). Referring back to block 516, if the characters generally do not match the most likely keys in the key probability array, the user is found to be accurate and the process for generating word probabilities 504 is incrementally tuned to favor the word probability based on the key probability 506. The word is entered in the field at block 522 and the frequency of the word is used to increment, update and modify the word to reflect that the word has been recently used (one more time) at block 524.

Figure 6:
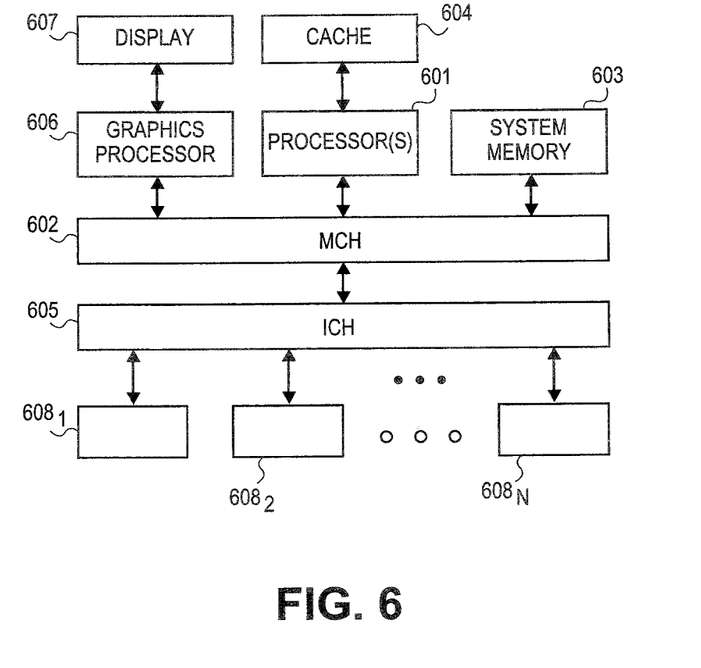
FIG. 6 illustrates an embodiment of a computing system.

FIG. 6 illustrates an embodiment of a computing system 600. The computing system 600 includes any type or size of computing system, such as a mobile computing system or a handheld data processing device, such as a PDA, smartphone, pocket computer, etc. The exemplary computing system of FIG. 6 includes: 1) one or more processors 601 at least one of which may include features described above (e.g., components and logic for customizable and predictive dictionary); 2) a memory control hub (MCH) 602; 3) a system memory 603 (of which different types exist such as double data rate RAM (DDR RAM), extended data output RAM (EDO RAM) etc.); 4) a cache 604; 5) an input/output (I/O) control hub (ICH) 605; 6) a graphics processor 606; 7) a display/screen 607 (of which different types exist such as Cathode Ray Tube (CRT), Thin Film Transistor (TFT), Liquid Crystal Display (LCD), DPL, etc.; and 8) one or more I/O devices 608 (e.g., keyboard, touchpad, mouse, Bluetooth components, etc.).

The one or more processors 601 execute instructions in order to perform whatever software routines the computing system implements, such as, in these embodiments, the functions and operations of customizable and predictive dictionary as described throughout this document. The instructions frequently involve some sort of operation performed upon data. Both data and instructions are stored in system memory 603 and cache 604. Cache 604 is typically designed to have shorter latency times than system memory 603. For example, cache 604 might be integrated onto the same silicon chip(s) as the processor(s) and/or constructed with faster static RAM (SRAM) cells whilst system memory 603 might be constructed with slower dynamic RAM (DRAM) cells. By tending to store more frequently used instructions and data in the cache 604 as opposed to the system memory 603, the overall performance efficiency of the computing system improves.

System memory 603 is deliberately made available to other components within the computing system 600. For example, the data received from various interfaces to the computing system 600 (e.g., keyboard and mouse, printer port, Local Area Network (LAN) port, modem port, etc.) or retrieved from an internal storage element of the computer system (e.g., hard disk drive) are often temporarily queued into system memory 603 prior to their being operated upon by the one or more processor(s) 601 in the implementation of a software program. Similarly, data that a software program determines should be sent from the computing system to an outside entity through one of the computing system interfaces, or stored into an internal storage element, is often temporarily queued in system memory 603 prior to its being transmitted or stored. System memory 603 may also be used to store the dictionary and other relevant information as described elsewhere in this document.

The ICH 605 is responsible for ensuring that such data is properly passed between the system memory 603 and its appropriate corresponding computing system interface (and internal storage device if the computing system is so designed). The MCH 602 is responsible for managing the various contending requests for system memory 603 accesses amongst the processor(s) 601, interfaces and internal storage elements that may proximately arise in time with respect to one another.

One or more I/O devices 608 are also implemented in a typical computing system 600. I/O devices generally are responsible for transferring data to and/or from the computing system (e.g., a networking adapter); or, for large scale non-volatile storage within the computing system (e.g., hard disk drive). ICH 605 has bi-directional point-to-point links between itself and the observed I/O devices 608.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

In the foregoing specification, the invention has been described with reference to specific exemplary embodiments thereof. It will, however, be evident that various modifications and changes may be made thereto without departing from the broader spirit and scope of the invention as set forth in the appended claims. The Specification and drawings are, accordingly, to be regarded in an illustrative rather than a restrictive sense.

I claim:

1. A method comprising:
selecting a list of forbidden words from a plurality of lists of forbidden words on a computing device when the computing device is set to a user mode corresponding to the selected list of forbidden words, wherein each of the plurality of lists of forbidden words corresponds to at least one user mode of a plurality of user modes and contains user mode-based forbidden words whose use on the computing device is prohibited when the computing device is set to one or more corresponding user modes,
wherein the forbidden words are regarded and maintained based on at least one of their sensitivity, tolerance, and usage relating to each user mode associated with a user of the computing device, wherein each forbidden word is assigned a strictness level based on one or more of the sensitivity, the tolerance, and the usage and placed in mode lists associated with each user mode of the plurality of user modes, wherein the strictness level changes in correspondence with changes relating to the one or more of the sensitivity, the tolerance, and the usage and wherein a forbidden word is added to or removed from a mode list by the user or at least one of an organization or a group associated with the user, wherein the mode lists having the selected list of forbidden words are maintained as a customizable directory separately from a base directory having the plurality of lists of forbidden words, wherein the strictness level includes at least one of appropriately forbidden and strictly forbidden; and
preventing first mode-based forbidden words of the selected list of forbidden words to be used on the computing device for as long as the computing device is set to the user mode.

2. The method of claim 1, further comprising updating a pre loaded dictionary by associating the plurality of lists of forbidden words to the pre-loaded dictionary, the pre-loaded dictionary having basic forbidden words whose use is prohibited regardless of the plurality of user modes of the computing device, wherein selecting is further based on one or more of a preceding word, parsing of parts of a speech, one or more predictive subsequent words, one or more part of the speech likely to be associated with the one or more subsequent words, and a set of words based on the user's pattern of word choices.

3. The method of claim 1, wherein the plurality of lists of forbidden words is gradually populated with the user-mode based forbidden words based on their use by the user of the computing device.

4. The method of claim 1, wherein the plurality of lists of forbidden words is gradually populated with the user-mode based forbidden words based on a policy associated with a group.

5. The method of claim 1, wherein the computing device is set to a user mode of the plurality of user modes according to a user-assigned time slot.

6. The method of claim 1, wherein the computing device is set to a user mode of the plurality of user modes based on surrounding awareness of the computing device, the surrounding awareness includes identifying a user mode corresponding to a physical location when the computing device is within a proximate range of the physical location.

7. The method of claim 6, wherein the plurality of user modes corresponds to a plurality of physical locations.

8. The method of claim 1, further comprising automatically triggering a list of the plurality of lists of forbidden words when the computing device enters a corresponding user mode of the plurality of user modes.

9. The method of claim 1, wherein the plurality of user modes comprises one or more of a family user mode, a play user mode, and a work user mode, wherein each of the user mode is based on an association or a policy relating to the user, wherein the association includes family association or friends association, and wherein the policy includes employer policy or government policy.

10. A system having a computing device comprising a storage medium and a processor coupled to the storage medium, the processor to:
select a list of forbidden words from a plurality of lists of forbidden words on a computing device when the computing device is set to a user mode corresponding to the selected list of forbidden words, wherein each of the plurality of lists of forbidden words corresponds to at least one user mode of a plurality of user modes and contains user mode-based forbidden words whose use on the computing device is prohibited when the computing device is set to one or more corresponding user modes,
wherein the forbidden words are regarded and maintained based on at least one of their sensitivity, tolerance, and usage relating to each user mode associated with a user of the computing device, wherein each forbidden word is assigned a strictness level based on one or more of the sensitivity, the tolerance, and the usage and placed in mode lists associated with each user mode of the plurality of user modes, wherein the strictness level changes in correspondence with changes relating to the one or more of the sensitivity, the tolerance, and the usage and wherein a forbidden word is added to or removed from a mode list by the user or at least one of an organization or a group associated with the user, wherein the mode lists having the selected list of forbidden words are maintained as a customizable directory separately from a base directory having the plurality of lists of forbidden words, wherein the strictness level includes at least one of appropriately forbidden and strictly forbidden; and
prevent mode-based forbidden words of the selected list of forbidden words to be used on the computing device for as long as the computing device is set to the user mode.

11. The system of claim 10, wherein the processor is further to update a pre-loaded dictionary by associating the plurality of lists of forbidden words to the pre-loaded dictionary, the pre-loaded dictionary having basic forbidden words whose use is prohibited regardless of the plurality of user modes of the computing device, wherein selecting is further based on one or more of a preceding word, parsing of parts of a speech, one or more predictive subsequent words, one or more part of the speech likely to be associated with the one or more subsequent words, and a set of words based on the user's pattern of word choices.

12. The system of claim 10, wherein the plurality of lists of forbidden words is gradually populated with the user-mode based forbidden words based on their use by the user of the computing device.

13. The system of claim 10, wherein the plurality of lists of forbidden words is gradually populated with the user-mode based forbidden words based on a policy associated with a group.

14. The system of claim 10, wherein the computing device is set to a user mode of the plurality of user modes according to a user-assigned time slot.

15. The system of claim 10, wherein the computing device is set to a user mode of the plurality of user modes based on surrounding awareness of the computing device, the surrounding awareness includes identifying a user mode corresponding to a physical location when the computing device is within a proximate range of the physical location.

16. The system of claim 10, wherein the processor is further to automatically trigger a list of the plurality of lists of forbidden words when the computing device enters a corresponding user mode of the plurality of user modes.

17. The system of claim 10, wherein the plurality of user modes comprises one or more of a family user mode, a play user mode, and a work user mode, wherein each of the user mode is based on an association or a policy relating to the user, wherein the association includes family association or friends association, and wherein the policy includes employer policy or government policy.

18. At least one non-transitory machine-readable medium comprising instructions which, when executed, cause a machine to:
select a list of forbidden words from a plurality of lists of forbidden words on a computing device when the computing device is set to first user mode corresponding to the selected list of forbidden words, wherein each of the plurality of lists of forbidden words corresponds to at least one user mode of a plurality of user modes and contains user mode-based forbidden words whose use on the computing device is prohibited when the computing device is set to one or more corresponding user modes,
wherein the forbidden words are regarded and maintained based on at least one of their sensitivity, tolerance, and usage relating to each user mode associated with a user of the computing device, wherein each forbidden word is assigned a strictness level based on one or more of the sensitivity, the tolerance, and the usage and placed in mode lists associated with each user mode of the plurality of user modes, wherein the strictness level changes in correspondence with changes relating to the one or more of the sensitivity, the tolerance, and the usage and wherein a forbidden word is added to or removed from a mode list by the user or at least one of an organization or a group associated with the user, wherein the mode lists having the selected list of forbidden words are maintained as a customizable directory separately from a base directory having the plurality of lists of forbidden words, wherein the strictness level includes at least one of appropriately forbidden and strictly forbidden; and
prevent mode-based forbidden words of the selected list of forbidden words to be used on the computing device for as long as the computing device is set to the user mode.

19. The non-transitory machine-readable medium of claim 18, wherein the instructions which, when executed, further cause the machine to update a pre-loaded dictionary by associating the plurality of lists of forbidden words to the pre-loaded dictionary, the pre-loaded dictionary having basic forbidden words whose use is prohibited regardless of the plurality of user modes of the computing device, wherein selecting is further based on one or more of a preceding word, parsing of parts of a speech, one or more predictive subsequent words, one or more part of the speech likely to be associated with the one or more subsequent words, and a set of words based on the user's pattern of word choices.

20. The non-transitory machine-readable medium of claim 19, wherein the plurality of lists of forbidden words are gradually populated with the user-mode based forbidden words based on a policy associated with a group.

21. The non-transitory machine-readable medium of claim 18, wherein the plurality of lists of forbidden words are gradually populated with the user-mode based forbidden words based on their use by the user of the computing device.

22. The non-transitory machine-readable medium of claim 18, wherein the computing device is set to a user mode of the plurality of user modes according to a user-assigned time slot.

23. The non-transitory machine-readable medium of claim 18, wherein the computing device is set to a user mode of the plurality of user modes based on surrounding awareness of the computing device, the surrounding awareness includes identifying a user mode corresponding to a physical location when the computing device is within a proximate range of the physical location.

24. The non-transitory machine-readable medium of claim 18, wherein the machine is further to automatically trigger a list of the plurality of lists of forbidden words when the computing device enters a corresponding user mode of the plurality of user modes.

25. The non-transitory machine-readable medium of claim 18, wherein the plurality of user modes comprises one or more of a family user mode, a play user mode, and a work user mode, wherein each of the user mode is based on an association or a policy relating to the user, wherein the association includes family association or friends association, and wherein the policy includes employer policy or government policy.

* * * * *